(12) United States Patent
Chikagawa

(10) Patent No.: US 12,283,699 B2
(45) Date of Patent: Apr. 22, 2025

(54) SOLID STATE BATTERY

(71) Applicant: Murata Manufacturing Co., Ltd., Nagaokakyo (JP)

(72) Inventor: Osamu Chikagawa, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 536 days.

(21) Appl. No.: 17/697,299

(22) Filed: Mar. 17, 2022

(65) Prior Publication Data
US 2022/0209338 A1    Jun. 30, 2022

Related U.S. Application Data

(63) Continuation of application No. PCT/JP2020/038273, filed on Oct. 9, 2020.

(30) Foreign Application Priority Data

Oct. 11, 2019    (JP) .................. 2019-187609

(51) Int. Cl.
*H01M 50/141*    (2021.01)
*H01M 10/0525*    (2010.01)
(Continued)

(52) U.S. Cl.
CPC ..... *H01M 50/141* (2021.01); *H01M 10/0525* (2013.01); *H01M 10/0562* (2013.01);
(Continued)

(58) Field of Classification Search
CPC .. H01M 50/102; H01M 50/11; H01M 50/117; H01M 50/133; H01M 50/141; H01M 10/0562
See application file for complete search history.

(56) References Cited

U.S. PATENT DOCUMENTS

| 8,883,347 B2 | 11/2014 | Baba et al. |
| 9,263,727 B2 | 2/2016 | Baba et al. |

(Continued)

FOREIGN PATENT DOCUMENTS

| JP | 2008186595 A | 8/2008 |
| JP | 2015220107 A | 12/2015 |

(Continued)

OTHER PUBLICATIONS

Machine Translation of JP-2016001600-A (Year: 2016).*

(Continued)

*Primary Examiner* — Gregg Cantelmo
(74) *Attorney, Agent, or Firm* — ArentFox Schiff LLP

(57) ABSTRACT

A solid state battery that includes: a battery element including, along a stacking direction, one or more battery constituent units including a positive electrode layer, a negative electrode layer, and a solid electrolyte layer interposed between the positive electrode layer and the negative electrode layer; first and second external terminals joined to an extended portion of each electrode layer of the positive electrode layer and the negative electrode layer, respectively; and a protective layer that covers a surface of the battery element other than the extended portions of each electrode layer, the protective layer including a side portion on a central region of a side portion of the battery element extending in substantially the same direction as the stacking direction and in which a first thickness dimension of a first portion is larger than a second thickness dimension of a second portion other than the first portion.

13 Claims, 3 Drawing Sheets

(51) Int. Cl.
*H01M 10/0562* (2010.01)
*H01M 50/103* (2021.01)
*H01M 50/117* (2021.01)
*H01M 50/133* (2021.01)
*H01M 50/543* (2021.01)

(52) U.S. Cl.
CPC ....... *H01M 50/103* (2021.01); *H01M 50/117* (2021.01); *H01M 50/133* (2021.01); *H01M 50/543* (2021.01)

(56) References Cited

U.S. PATENT DOCUMENTS

| 11,050,091 B2 | 6/2021 | Shimuzu et al. | |
|---|---|---|---|
| 2003/0040420 A1* | 2/2003 | Larsen | H01M 8/0271 |
| | | | 501/15 |
| 2007/0042265 A1* | 2/2007 | Tamai | H01M 10/0562 |
| | | | 264/618 |
| 2009/0061309 A1* | 3/2009 | Ushio | H01M 50/56 |
| | | | 429/185 |
| 2009/0162743 A1* | 6/2009 | Nam | H01M 50/119 |
| | | | 429/150 |
| 2009/0202912 A1 | 8/2009 | Baba et al. | |
| 2012/0015234 A1* | 1/2012 | Iwaya | H01M 10/0562 |
| | | | 429/152 |
| 2014/0338817 A1 | 11/2014 | Baba et al. | |
| 2015/0213955 A1* | 7/2015 | Lee | H01G 2/065 |
| | | | 174/258 |
| 2019/0252728 A1 | 8/2019 | Shimuzu et al. | |
| 2019/0288246 A1 | 9/2019 | Kato et al. | |
| 2020/0106125 A1 | 4/2020 | Yano et al. | |
| 2020/0350524 A1 | 11/2020 | Nakashima et al. | |

FOREIGN PATENT DOCUMENTS

| JP | 2016001600 A * | 1/2016 | |
|---|---|---|---|
| WO | 2007135790 A1 | 11/2007 | |
| WO | 2018087970 A1 | 5/2018 | |
| WO | 2018123319 A1 | 7/2018 | |
| WO | 2018163514 A1 | 9/2018 | |
| WO | 2018181288 A1 | 10/2018 | |
| WO | 2018186449 A1 | 10/2018 | |
| WO | WO-2018181575 A1 * | 10/2018 | ........ H01M 10/0525 |
| WO | 2018235398 A1 | 12/2018 | |
| WO | 2019176945 A1 | 9/2019 | |

OTHER PUBLICATIONS

International Search Report issued in PCT/JP2020/038273, date of mailing Dec. 15, 2020.
International Search Report issued in PCT/JP2020/038277, date of mailing Dec. 22, 2020.
Written Opinion of the International Searching Authority issued in PCT/JP2020/038277, date of mailing Dec. 22, 2020.

* cited by examiner

FIG. 5(iii)
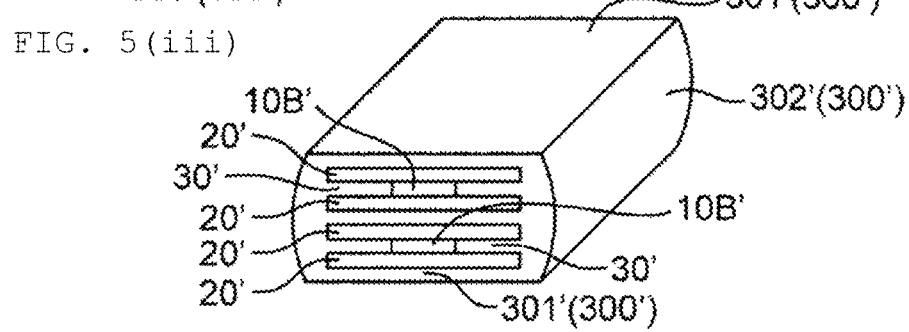

SOLID STATE BATTERY

CROSS REFERENCE TO RELATED APPLICATIONS

The present application is a continuation of International application No. PCT/JP2020/038273, filed Oct. 9, 2020, which claims priority to Japanese Patent Application No. 2019-187609, filed Oct. 11, 2019, the entire contents of each of which are incorporated herein by reference.

FIELD OF THE INVENTION

The present invention relates to a solid state battery.

BACKGROUND OF THE INVENTION

Conventionally, a secondary battery that can be repeatedly charged and discharged has been used for various applications. For example, secondary batteries are used as power sources of electronic devices such as smart phones and notebook computers.

In secondary batteries, liquid electrolytes (electrolytic solutions) such as organic solvents have been used as media for moving ions. However, in secondary batteries using an electrolytic solution, there is a problem such as leakage of the electrolytic solution. Thus, development of a solid battery including a solid electrolyte instead of a liquid electrolyte has been proceeding.

Patent Document 1: WO 2018123319 A

SUMMARY OF THE INVENTION

A solid state battery typically includes a battery element and a protective layer. The battery element includes, along a stacking direction, one or more battery constituent units including a positive electrode layer and a negative electrode layer facing each other, and a solid electrolyte layer interposed between the positive electrode layer and the negative electrode layer. The protective layer is a layer that covers a surface of the battery element other than an extended portion of each electrode layer of the positive electrode layer and the negative electrode layer such that an external terminal can be joined thereto.

Here, it is known that as ions move in the solid electrolyte layer between the positive electrode layer and the negative electrode layer during charging and discharging of the solid state battery, an active material layer included in each electrode layer can expand and contract along the stacking direction. In particular, when the active material layer, that is, the electrode layer expands along the stacking direction, tensile stress acting in an upward direction and tensile stress acting in a downward direction are generated due to this. As a result, the tensile stress is maximized at a central portion of a side portion of the battery element, and there is a possibility that cracks are generated on a surface of the solid state battery, such as a surface of the protective layer located near the central portion of the side portion of the battery element.

Generation of such cracks may cause intrusion of moisture or the like from the outside into the electrode layer and the solid electrolyte layer in the solid state battery. Thus, there is a possibility that ions cannot suitably move in the solid electrolyte layer between the positive electrode layer and the negative electrode layer during charging and discharging of the solid state battery. As a result, there is a possibility that the solid state battery cannot be suitably charged and discharged.

The present invention has been made in view of the above circumstances. That is, a main object of the present invention is to provide a solid state battery capable of suitably suppressing generation of cracks on the surface during charging and discharging.

To achieve the above object, an embodiment of the present invention provides a solid state battery including: a battery element including, along a stacking direction, one or more battery constituent units including a positive electrode layer having a positive electrode extended portion, a negative electrode layer having a negative electrode extended portion, and a solid electrolyte layer interposed between the positive electrode layer and the negative electrode layer; a first external terminal joined to the positive electrode extended portion of the positive electrode layer; a second external terminal joined to the negative electrode extended portion of the negative electrode layer; and a protective layer that covers a surface of the battery element other than the positive electrode extended portion of the positive electrode layer and the negative electrode extended portion of the, the protective layer including a side portion which is located on a central region of a side portion of the battery element extending in substantially a same direction as the stacking direction, a first portion of the side portion of the protective layer having a first thickness dimension that is larger than a second thickness dimension of a second portion of the side portion of the protective layer other than the first portion.

According to the solid state battery according to one embodiment of the present invention, it is possible to suitably suppress generation of cracks on the surface during charging and discharging.

DETAILED DESCRIPTION OF THE INVENTION

Figure 1:
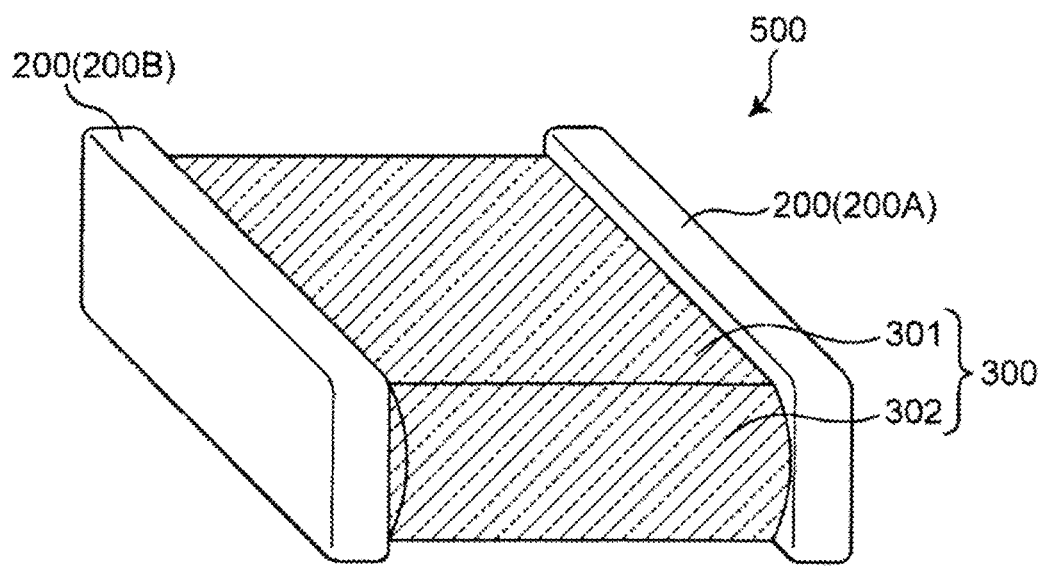
FIG. 1 is a perspective view schematically showing a solid state battery according to one embodiment of the present invention.

Hereinafter, the "solid state battery" of the present invention will be described in detail. Although description will be made with reference to the drawings as necessary, illustrated contents are schematically and exemplarily shown wherein their appearances, their dimensional proportions and the like are not necessarily real ones, and are merely for the purpose of making it easy to understand the present invention.

The term "solid state battery" used in the present invention refers to, in a broad sense, a battery whose constituent elements are composed of solid and refers to, in a narrow sense, all solid state battery whose battery constituent elements (particularly preferably all battery constituent elements) are composed of solid. In a preferred embodiment, the solid state battery in the present invention is a stacked solid state battery configured such that layers constituting a battery constituent unit are stacked with each other, and preferably such layers are composed of a sintered body. The "solid state battery" includes not only a so-called "secondary battery" capable of repeating charging and discharging, but also a "primary battery" capable of only discharging. According to a preferred embodiment of the present invention, the "solid battery" is a secondary battery. The "secondary battery" is not excessively limited by its name, and can include, for example, an electric storage device.

The term "planar view" used here is based on a form where an object is viewed from above or below along a thickness direction based on a stacking direction of layers constituting the solid state battery. The term "sectional view" used here is based on a form when viewed from a direction substantially perpendicular to the thickness direction based on the stacking direction of layers constituting the solid state battery (to put it briefly, a form when taken along a plane parallel to the thickness direction). The terms "vertical direction" and "horizontal direction" directly or indirectly used here correspond respectively to the vertical direction and the horizontal direction in the drawing. Unless otherwise stated, the same numerals and symbols denote the same members or portions or the same contents. In a preferred aspect, it can be grasped that a vertical downward direction (that is, a direction in which gravity acts) corresponds to a "downward direction", and the opposite direction corresponds to an "upward direction".

Unless otherwise described, various numerical ranges mentioned herein are intended to include the very numerical values of the lower and upper limits. Specifically, for example, taking a numerical range "1 to 10" as an example, unless otherwise described, it is interpreted that the numerical range includes the lower limit "1" and also includes the upper limit "10".

[Configuration of Solid State Battery]

The solid state battery includes at least positive and negative electrode layers and a solid electrolyte. Specifically, the solid state battery includes a battery element that includes a battery constituent unit including a positive electrode layer, a negative electrode layer, and a solid electrolyte interposed between the positive electrode layer and the negative electrode layer.

In the solid state battery, each layer constituting the solid state battery may be formed by firing, and the positive electrode layer, the negative electrode layer, the solid electrolyte layer, and the like form a sintered layer. Preferably, the positive electrode layer, the negative electrode layer, and the solid electrolyte are fired integrally with each other, and therefore the battery element forms an integrally sintered body.

The positive electrode layer is an electrode layer containing at least a positive electrode active material. The positive electrode layer may further contain a solid electrolyte. For example, the positive electrode layer includes a sintered body containing at least positive electrode active material grains and solid electrolyte grains. In one preferred aspect, the positive electrode layer includes a sintered body containing substantially only positive electrode active material grains and solid electrolyte grains. On the other hand, the negative electrode layer is an electrode layer containing at least a negative electrode active material. The negative electrode layer may further contain a solid electrolyte. For example, the negative electrode layer includes a sintered body containing at least negative electrode active material grains and solid electrolyte grains. In one preferred aspect, the negative electrode layer includes a sintered body containing substantially only negative electrode active material grains and solid electrolyte grains.

The positive electrode active material and the negative electrode active material are substances involved in transfer of electrons in the solid state battery. Ions move (are conducted) between the positive electrode layer and the negative electrode layer with the solid electrolyte therebetween to transfer electrons, so that the solid state battery is charged and discharged. The positive electrode layer and the negative electrode layer are particularly preferably layers capable of inserting and extracting lithium ions. That is, the solid state battery is preferably an all-solid-state secondary battery in which lithium ions move between the positive electrode layer and the negative electrode layer with the solid electrolyte interposed between the layers, thereby charging and discharging the battery.

(Positive Electrode Active Material)

Examples of the positive electrode active material contained in the positive electrode layer include at least one selected from the group consisting of a lithium-containing phosphate compound having a nasicon-type structure, a lithium-containing phosphate compound having an olivine-type structure, a lithium-containing layered oxide, and a lithium-containing oxide having a spinel-type structure. As an example of the lithium-containing phosphate compound having a nasicon-type structure, $Li_3V_2(PO_4)_3$ can be used. As an example of the lithium-containing phosphate compound having an olivine-type structure, $LiFePO_4$, $LiMnPO_4$, and the like can be used. As an example of the lithium-containing layered oxide, $LiCoO_2$, $LiCo_{1/3}Ni_{1/3}Mn_{1/3}O_2$, and the like can be used. As an example of the lithium-containing oxide having a spinel-type structure, $LiMn_2O_4$, $LiNi_{0.5}Mn_{1.5}O_4$, and the like can be used.

(Negative Electrode Active Material)

Examples of the negative electrode active material contained in the negative electrode layer include at least one selected from the group consisting of an oxide containing at least one element selected from the group consisting of Ti, Si, Sn, Cr, Fe, Nb, and Mo, a graphite-lithium compound, a lithium alloy, a lithium-containing phosphate compound having a nasicon-type structure, a lithium-containing phosphate compound having an olivine-type structure, and a lithium-containing oxide having a spinel-type structure. As an example of the lithium alloy, Li—Al alloys and the like can be used. As an example of the lithium-containing phosphate compound having a nasicon-type structure, $Li_3V_2(PO_4)_3$, $LiTi_2(PO_4)_3$, and the like can be used. As an example of the lithium-containing phosphate compound having an olivine-type structure, $LiCuPO_4$ and the like can be used. As an example of the lithium-containing oxide having a spinel-type structure, $Li_4Ti_5O_{12}$ and the like can be used.

In the solid state battery of the present invention in one preferred aspect, the positive electrode layer and the negative electrode layer are made of the same material.

The positive electrode layer and/or the negative electrode layer may contain a conductive aid. The conductive aid contained in the positive electrode layer and the negative electrode layer may be at least one agent that contains a metal material such as silver, palladium, gold, platinum, aluminum, copper, or nickel, carbon, and the like.

In addition, the positive electrode layer and/or the negative electrode layer may contain a sintering aid. Examples of the sintering aid include at least one selected from the group consisting of lithium oxide, sodium oxide, potassium oxide, boron oxide, silicon oxide, bismuth oxide, and phosphorus oxide.

(Solid Electrolyte)

The solid electrolyte is a material capable of conducting lithium ions. In particular, the solid electrolyte constituting the battery constituent unit in the solid state battery forms a layer through which lithium ions can conduct between the positive electrode layer and the negative electrode layer. The solid electrolyte may be provided at least between the positive electrode layer and the negative electrode layer. That is, the solid electrolyte may exist around the positive electrode layer and/or the negative electrode layer so as to protrude from between the positive electrode layer and the negative electrode layer. Specific examples of the solid electrolyte include a lithium-containing phosphate compound having a nasicon structure, an oxide having a perovskite structure, and an oxide having a garnet-type structure or a structure similar to the garnet-type structure. Examples of the lithium-containing phosphate acid compound having a nasicon structure include $Li_xM_y(PO_4)_3$ ($1 \le x \le 2$, $1 \le y \le 2$, M is at least one selected from the group consisting of Ti, Ge, Al, Ga and Zr). As an example of the lithium-containing phosphate compound having a nasicon structure, $Li_{1.2}Al_{0.2}Ti_{1.8}(PO_4)_3$ and the like can be used, for example. As an example of the oxide having a perovskite structure, $La_{0.55}Li_{0.35}TiO_3$ and the like can be used. As an example of the oxide having a garnet-type structure or a structure similar to the garnet-type structure, $Li_7La_3Zr_2O_{12}$ and the like can be used.

The solid electrolyte may contain a sintering aid. The sintering aid contained in the solid electrolyte may be selected from, for example, a material similar to the sintering aid that can be contained in the positive electrode layer/the negative electrode layer (Terminal)

Solid state batteries are generally provided with terminals (for example, external terminals). Terminals are provided, in particular, on side portions of solid state batteries. Specifically, a terminal on the positive electrode side connected to the positive electrode layer and a terminal on the negative electrode side connected to the negative electrode layer are provided on the side portions of the solid state battery. The terminal of the positive electrode layer is joined to an end portion of the positive electrode layer, specifically, an extended portion formed at the end portion of the positive electrode layer. The terminal of the negative electrode layer is joined to an end portion of the negative electrode layer, specifically, an extended portion formed at the end portion of the negative electrode layer. In one preferred aspect, the terminal preferably contains glass or glass ceramics from the viewpoint of being joined to the extended portion of the electrode layer. Furthermore, the terminal preferably contains a material having high conductivity. Although not particularly limited, specific examples of the material of the terminal include at least one selected from the group consisting of silver, gold, platinum, aluminum, copper, tin, and nickel.

(Protective Layer)

A protective layer can be generally formed on an outermost side of the solid state battery, and used to electrically, physically, and/or chemically protect. As a material forming the protective layer, preferred is a material that is excellent in insulation property, durability and/or moisture resistance, and is environmentally safe.

The protective layer is a layer that covers a surface of the battery element other than the extended portion of each electrode layer so that the extended portion of each electrode layer and each external terminal can be joined to each other. Specifically, the protective layer covers the surface of the battery element so that the extended portion of the positive electrode layer and the external terminal on the positive electrode side can be joined, and covers the surface of the battery element so that the extended portion of the negative electrode layer and the external terminal on the negative electrode side can be joined. That is, the protective layer does not cover the whole surface of the battery element without a gap, but covers the battery element so that the extended portion of the electrode layer (end portion of the electrode layer) is exposed in order to join the extended portion of the electrode layer of the battery element and the external terminal.

[Features of the Present Invention]

Hereinafter, features of the present invention will be described.

The inventor of the present application has intensively studied to find a solution for a technical problem of a conventional solid state battery (generation of cracks due to generation of tensile stress caused by expansion of an electrode layer along a stacking direction). As a result, the inventor of the present application has devised a solid state battery 500 according to one embodiment of the present invention having the following features (see FIGS. 1 to 3).

Figure 2:
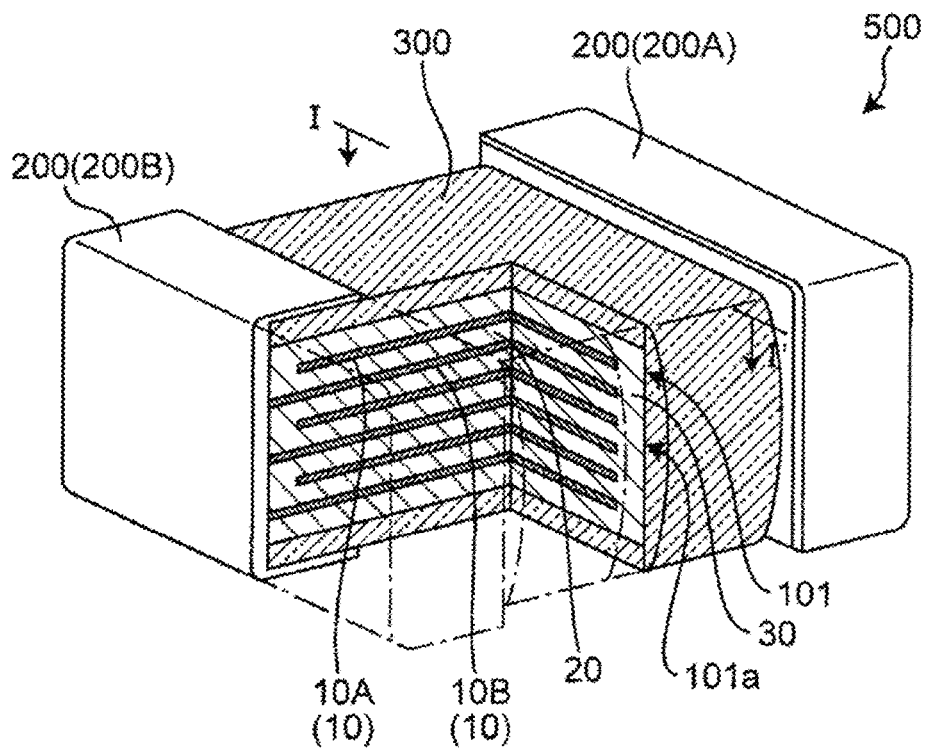
FIG. 2 is a perspective view schematically showing the solid state battery showing a partial internal structure according to one embodiment of the present invention.
Figure 3:
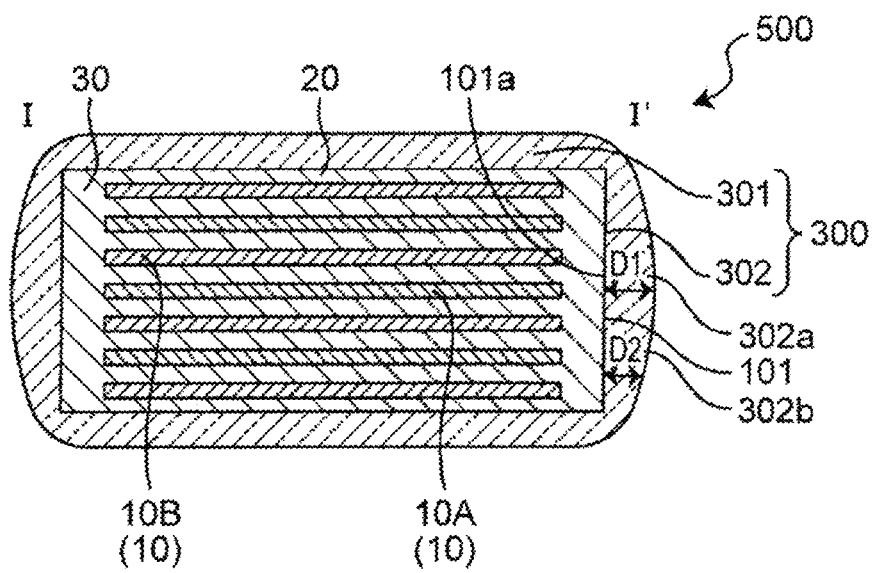
FIG. 3 is a sectional view schematically showing the solid state battery according to one embodiment of the present invention between line I-I' in FIG. 1.

FIG. 1 shows a perspective view schematically showing a solid state battery according to one embodiment of the present invention. FIG. 2 shows a perspective view schematically showing the solid state battery showing a partial internal structure according to one embodiment of the present invention. FIG. 3 shows a sectional view schematically showing the solid state battery according to one embodiment of the present invention between line I-I' in FIG. 1.

The solid state battery 500 according to one embodiment of the present invention is characterized in that a protective layer 300 includes a side portion having the following unique configuration. Specifically, the protective layer 300 includes a side portion 302 in which a first thickness dimension D1 of a first predetermined portion 302a located on a central region 101a of a side portion 101 of a battery element 100 extending in substantially the same direction as the stacking direction that is larger than a second thickness dimension D2 of a second portion 302b other than the first predetermined portion. The dimension D1 may be 20 μm to 200 μm, and is preferably 30 μm to 100 μm, for example, 50 μm. The dimension D2 may be 5 μm to 50 μm, and is preferably 10 μm to 30 μm, for example, 20 μm.

The central region 101a of the side portion 101 of the battery element 100 refers to a portion in which a line segment connecting an upper end portion and a lower end portion of the side portion 101 of the battery element 100 is divided into half in sectional view. The first predetermined portion 302a of the side portion 302 of the protective layer located on the central region 101a of the side portion 101 of the battery element 100 refers to a minimal surface region having a slight "width" rather than a "point" region. Thus, the whole first predetermined portion 302a of the side portion 302 of the protective layer used here does not necessarily have to be curved outward, and a case where at least a part thereof is larger than the second thickness dimension D2 of the second portion 302b of the side portion 302 of the protective layer may be included.

By adopting such a configuration, the following technical effects can be achieved.

Specifically, when an electrode layer 10 (10A, 10B) expands along the stacking direction, the tensile stress is maximized in the central region 101*a* of the side portion 101 of the battery element 100, and as a result, cracks may be generated on a surface of the solid state battery 500, such as the surface of the protective layer 302 located near a central portion of the side portion 101 of the battery element 100.

In this regard, in one embodiment of the present invention, the first thickness dimension D1 of the first predetermined portion 302*a* of the side portion 302 of the protective layer 300 located on the central region 101*a* of the side portion 101 of the battery element 100 at which the tensile stress is maximized is larger than the second thickness dimension D2 of the second portion 302*b* other than the first predetermined portion 302*a*.

This makes it possible to disperse the stress on the whole surface without concentrating the stress on the side of the first predetermined portion 302*a* of the side portion 302 of the protective layer 300 as compared with a case where the thicknesses of the side portions of the protective layer 300 are substantially the same. As a result, it is possible to prevent generation of cracks due to the dispersion of the stress.

Thus, it is possible to suitably suppress generation of cracks on the surface of the solid state battery 500, such as a surface 302*c* of the side portion 302 of the protective layer 300 located near the central region 101*a* of the side portion 101 of the battery element 100 of the solid state battery 500 according to one embodiment of the present invention.

By suppressing such generation of cracks, it is possible to avoid intrusion of moisture or the like from the outside into the electrode layer 10 and a solid electrolyte layer 20 in the solid state battery 500. Thus, ions can suitably move in the solid electrolyte layer 20 between the positive electrode layer 10A and the negative electrode layer 10B during charging and discharging of the solid state battery 500. As a result, the solid state battery 500 according to one embodiment of the present invention can be suitably charged and discharged.

The solid state battery according to one embodiment of the present invention preferably adopts the following aspect.

In one aspect, in sectional view, the thickness dimension of the first predetermined portion 302*a* of the side portion 302 of the protective layer 300 located on the central region 101*a* of the side portion 101 of the battery element 100 is preferably a maximum dimension of the thickness of the side portion 302 of the protective layer 300. In other words, it is preferable that the side portion 302 of the protective layer 300 has an outer curved shape curved outward in sectional view.

By adopting such a configuration, if the largest tensile stress acts at the first predetermined portion 302*a* of the side portion 302 of the protective layer 300, it is possible to disperse and relax the stress by making a distance from the central region 101*a* to the first predetermined portion 302*a* of the side portion 302 of the protective layer 300 facing the central region 101*a* to be the longest distance.

When the distance between the central region 101*a* of the side portion 101 of the battery element 100 and the first predetermined portion 302*a* of the side portion 302 of the protective layer 300 facing the central region 101*a* is the longest, it is possible to maximize a region for dispersing the largest tensile stress. From the above, according to the present aspect, it is possible to prevent generation of cracks because the largest tensile stress can be more suitably dispersed.

Figure 4:
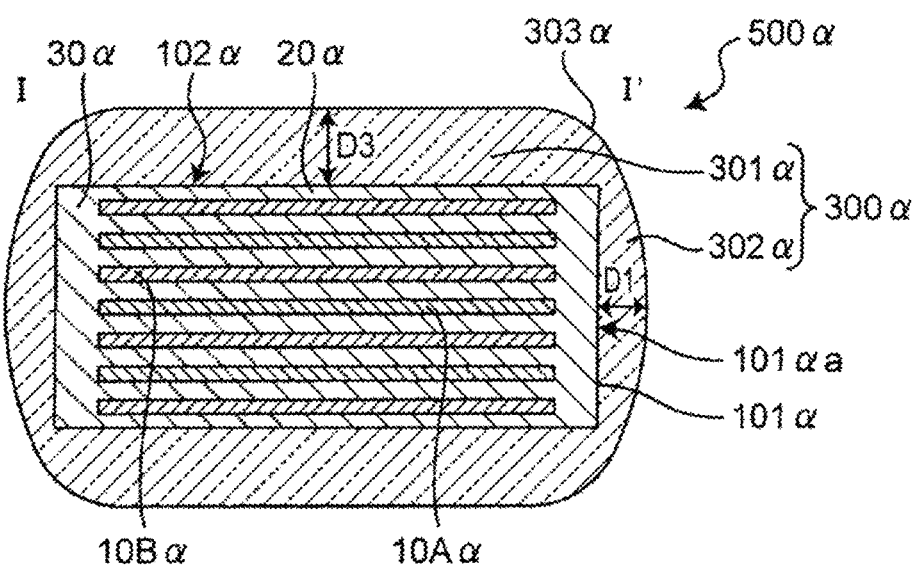
FIG. 4 is a sectional view schematically showing a solid state battery according to another embodiment of the present invention between line I-I' in FIG. 1.

In one aspect, it is preferable that a third thickness dimension D3 of at least one of mutually opposing upper portion and lower side portion 301*a* of a protective layer 300*a* located on a main surface 102*a* (corresponding to upper surface and lower surface of the battery element) of the battery element extending in a direction substantially perpendicular to the stacking direction is larger than the first thickness (maximum) dimension D1 of the side portion 302*a* of the protective layer 300*a* (see FIG. 4).

Although not particularly limited, the third thickness dimension D3 of at least one of the mutually opposing upper portion and lower side portion 301*a* of the protective layer 300 may be 200 μm to 1000 μm, and is preferably 500 μm to 1000 μm, for example, 600 μm. The first thickness (maximum) dimension D1 of the side portion 302*a* of the protective layer 300 may be 20 μm to 200 μm, and is preferably 30 μm to 100 μm, for example, 50 μm.

In a manufacturing process of the solid state battery described later, the obtained solid state batteries may rub against each other or collide with each other, and as a result, chipping and/or cracking may occur in a corner portion of the protective layer of the solid state battery in sectional view. In order to solve such a problem, it is conceivable to make the corner portion 303*a* of the protective layer 300*a* curved (i.e., radiused or chamfered).

In this regard, when the corner portion 303*a* is curved (i.e., radiused or chamfered), in view of the possibility that the battery element 100 is exposed, it is necessary to increase the thickness dimension of the side portion 302*a* of the protective layer 300*a* and/or the upper/lower side portion 301*a* of the protective layer 300*a*. However, when the thickness dimension of the side portion 302*a* of the protective layer 300*a* is increased as a whole, a mounting area on a mounting substrate increases, and there is a possibility that the number of solid state batteries that can be mounted on a single mounting substrate is restricted.

In view of such a point, as described above, the third thickness dimension of at least one of the upper portion and lower side portion 301*a* of the protective layer 300*a* is preferably larger than the thickness dimension of the side portion 302*a* of the protective layer 300*a* (see FIG. 4). This makes it possible to suitably suppress an increase in the mounting area and exposure of the battery element 100.

In addition, by relatively increasing the thickness dimension of at least one of the upper portion and lower side portion 301*a* of the protective layer 300*a*, the distance D3 from the main surface 102*a* (corresponding to the upper surface and lower surface of the battery element) of the battery element to a surface of the upper/lower side portion 301*a* of the protective layer can be increased. By increasing the distance D3, it is possible to provide a strength to withstand impact by a nozzle of a mounter at the time of mounting, and it is possible to avoid an influence on the battery element if a minute crack is generated when a polarity is printed on the surface of the upper/lower side portion 301*a* of the protective layer using a laser or the like. As a result, reliability of the solid state battery 500*a* itself according to one embodiment of the present invention can be suitably secured.

In one aspect, the protective layers 300 and 300*a* preferably include a resin-free insulating material (see FIGS. 1 to 4). The term "resin-free insulating material" used here is an insulating material that does not contain a resin and refers to an insulating organic material that does not have ion conductivity and electron conductivity.

In one embodiment of the present invention, the protective layers 300 and 300*a* include an insulating material other than resin. As described above, the insulating material refers to an insulating inorganic material having no ion conductivity and no electron conductivity, and the inorganic material having no ion conductivity refers to an inorganic material having an ion conductivity of $1\times10^{-7}$ S/cm or less. From the viewpoint of suppressing deterioration of the battery for a longer period of time, the ion conductivity is preferably $1\times10^{-12}$ S/cm or less. The ion conductivity of the inorganic material having no ion conductivity is usually $1\times10^{-18}$ S/cm or more. The inorganic material having no electron conductivity refers to an inorganic material having an electron conductivity of $1\times10^{-7}$ S/cm or less. From the viewpoint of suppressing deterioration of the battery for a longer period of time, the electron conductivity is preferably $1\times10^{-12}$ S/cm or less. The electron conductivity of the inorganic material having no electron conductivity is usually $1\times10^{-18}$ S/cm or more.

Since the protective layers 300 and 300a include such a resin-free insulating material, the protective layers 300 and 300a have further excellent moisture resistance, environmental resistance, and durability. Specifically, as compared with a protective layer containing a resin (for example, a polymer compound), the protective layer 300 can be a protective layer that hardly adsorbs, absorbs, and permeates moisture and a gas (carbon dioxide) and has high joint strength with a battery element. As a result, in the protective layers 300 and 300a, as compared with the protective layer containing a polymer compound, cracking and falling due to expansion by adsorption and absorption of moisture and gas (carbon dioxide) hardly occur, and falling due to vibration, impact, or the like hardly occurs. That is, the protective layers 300 and 300a can suitably function as water vapor transmission preventing layers for preventing the electrode of the battery element inside the solid state battery from being damaged.

Examples of the insulating material other than the resin constituting the protective layers 300 and 300a include an insulating material containing glass and ceramics. Examples of the glass include quartz glass ($SiO_2$) and composite oxide-based glass obtained by combining $SiO_2$ and at least one selected from the group consisting of $B_2O_3$, PbO, MgO, ZnO, $Bi_2O_3$, $Na_2O$, and $Al_2O_3$. Examples of the ceramics include at least one selected from the group consisting of $Al_2O_3$ (alumina), $ZnAl_2O_4$ (garnite), and $Mg_2SiO_4$ (forsterite).

The protective layers 300 and 300a include a sintered body containing insulating substance particles other than the resin described above. The sintered body constituting the protective layers 300 and 300a has a pore between the insulating substance particles, but has such compactness that adsorption, absorption, and permeation of moisture and gas (carbon dioxide) can be suppressed in the thickness direction (for example, the stacking direction).

Porosities of the protective layers 300 and 300a may be, for example, 0.1 vol % to 20 vol %, and particularly 1 vol % to 10% vol. As the porosity, a value measured by a weight porosity method, a computed tomography method using CT scanning, an immersion method, or the like is used. Oxygen permeability in the thickness direction of the protective layers 300 and 300a may be, for example, $10^{-1}$ cc/m²/day/ atmospheric pressure or less, particularly, $10^{-3}$ cc/m²/day/ atmospheric pressure or less. $H_2O$ permeabilities in the thickness direction of the protective layers 300 and 300a may be, for example, $10^{-2}$ g/m²/day or less, particularly, $10^{-4}$ g/m²/day or less. As the $H_2O$ permeability, a value measured at 25° C. by a carrier gas method, a crimping method, or a Ca corrosion method is used.

[Method of Manufacturing Solid State Battery]

Figure 5I:
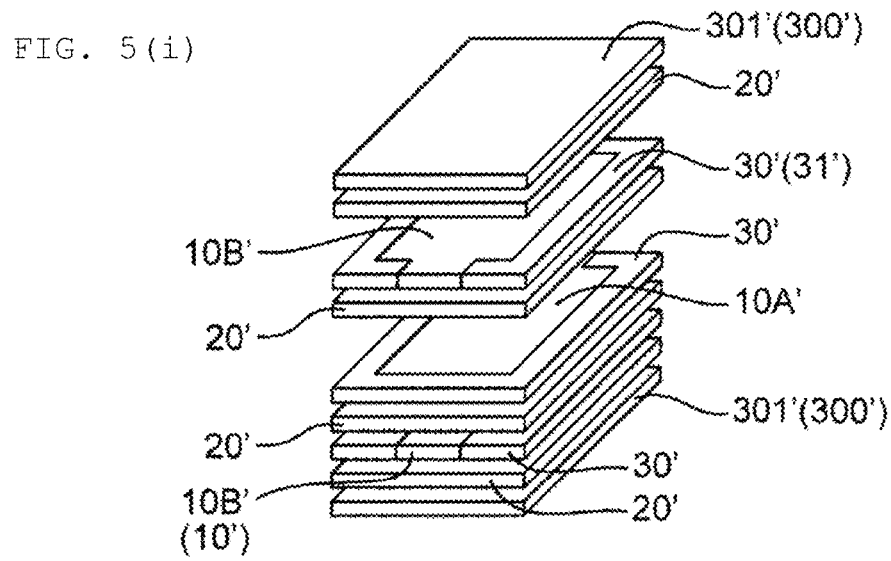
FIGS. 5(i) to 5(iv) are schematic views showing a manufacturing flow of the solid state battery according to one embodiment of the present invention.

Hereinafter, a method of manufacturing a solid state battery according to one embodiment of the present invention will be described (see FIGS. 5(i) to 5(iv)). In such a manufacturing method, the solid state battery can be manufactured by a printing method such as a screen printing method, a green sheet method using a green sheet, or a method combining these methods.

(Step of Forming Unfired Body)

First, a solid electrolyte layer paste is formed by mixing the solid electrolyte material, the sintering aid, the organic material, the solvent, and the like. The resin-free insulating material, the organic material, the solvent, and the like are mixed to form a protective layer paste.

A solid electrolyte layer sheet 20' and a protective layer sheet 301' are formed from the solid electrolyte layer paste and the protective layer paste, respectively, by sheet forming.

The positive electrode active material, the solid electrolyte, the conductive aid, the organic binder, the solvent, and any additive are mixed to form a positive electrode paste. Similarly, the negative electrode active material, the solid electrolyte, the conductive aid, the organic binder, the solvent, and any additive are mixed to form a negative electrode paste.

The organic material contained in the paste is not particularly limited, and a polymer compound such as a polyvinyl acetal resin, a cellulose resin, a polyacrylic resin, a polyurethane resin, a polyvinyl acetate resin, or a polyvinyl alcohol resin can be used. The solvent is not particularly limited as long as the organic material can be dissolved, and for example, toluene, ethanol and the like can be used.

For example, the positive electrode paste 10A' is printed on the solid electrolyte layer sheet 20', and a current collecting layer is printed as necessary. Similarly, for example, the negative electrode paste 10B' is printed on the solid electrolyte layer sheet 20', and a current collecting layer is printed as necessary. A buffer portion paste 30' (for example, solid electrolyte paste) is printed on the solid electrolyte layer sheet 20' so as to surround each electrode layer (see FIG. 5(i)).

Next, the protective layer sheet 301', the negative electrode paste 10B' and the buffer portion paste 30' printed on the solid electrolyte sheet 20', the positive electrode paste 10A' and the buffer portion paste 30' printed on the solid electrolyte sheet 20', the negative electrode paste 10B' and the buffer portion paste 30' printed on the solid electrolyte sheet 20', the solid electrolyte layer sheet 20', and the protective layer sheet 301' are stacked in this order from the bottom along the stacking direction.

Figure 5:
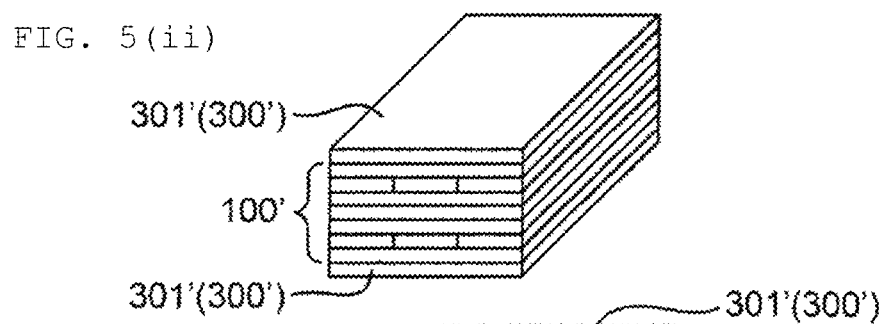
Figure 5:
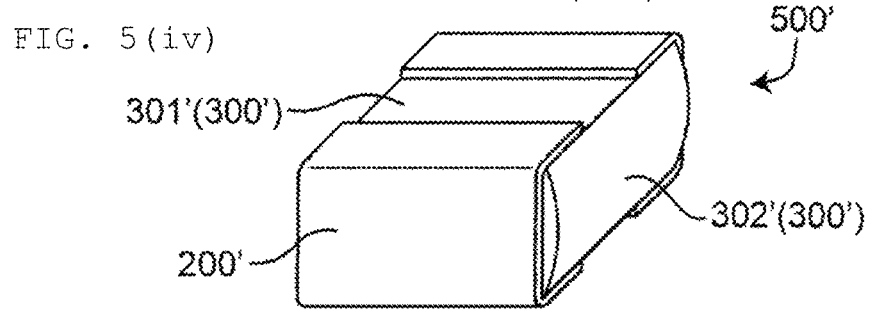

Thus, an unfired laminate is formed (see FIG. 5(ii)). After the unfired laminate is formed, a side surface of the unfired laminate is brought into contact with a protective layer material by a so-called dip treatment so that an end portion of a portion serving as the electrode layer to be joined to the external terminal is exposed (see FIG. 5(iii)).

(Firing Step)

Next, the unfired body is subjected to firing. Firing is carried out by removing the organic material in a nitrogen gas atmosphere containing oxygen gas, for example, at 500° C., and then heating in the nitrogen gas atmosphere, for example, at 550° C. to 1000° C. Firing is usually carried out while pressurizing the unfired body in the stacking direction (in some cases, stacking direction and direction perpendicular to the stacking direction). A pressurizing force is not particularly limited, and may be, for example, 1 kg/cm² to 1000 kg/cm², particularly 5 kg/cm² to 500 kg/cm².

Finally, the external electrode 300 is subjected to a baking treatment so as to be joined to the end portion of the electrode layer exposed after firing. The external electrodes on the positive electrode side and the negative electrode side are not limited to be formed after sintering of the laminate, and may be formed before firing and subjected to simultaneous sintering (see FIG. 5(iv)).

The external electrode on the positive electrode side can be formed by applying a conductive paste to a side surface of a sintered laminate from which the positive electrode layer is exposed. Similarly, the external electrode on the negative electrode side can be formed by applying a conductive paste to a side surface of a sintered laminate from which the negative electrode is exposed. When the external electrodes on the positive electrode side and the negative electrode side are provided so as to extend to a principal surface of the sintered laminate, the external terminals can be connected to a mounting land in a small area in the next step, which is preferable. The component of the external electrode may be selected from at least one selected from the group consisting of silver, gold, platinum, aluminum, copper, tin, and nickel.

As described above, the solid state battery 500 according to one embodiment of the present embodiment can be obtained (see FIGS. 1 to 3). In the obtained solid state battery 500, as described above, the thickness dimension of the predetermined portion in the side portion 302 of the protective layer 300, the side portion 302 being located on the central region of the side portion of the battery element 100, at which the tensile stress is maximized is larger than the thickness dimension of the other portion other than the predetermined portion. This makes it possible to disperse the stress on the whole surface without concentrating the stress on the side of the predetermined portion 302a of the side portion 302 of the protective layer 300 as compared with a case where the thicknesses of the side portions of the protective layer 300 are substantially the same. As a result, it is possible to prevent generation of cracks due to the dispersion of the stress.

Although the solid state battery according to one embodiment of the present invention has been described above, the present invention is not limited thereto, and it will be understood that various changes will be made by those skilled in the art without departing from the scope of the invention defined in the claims.

One embodiment of the present invention as described above includes the following preferable aspects.

First Aspect:

A solid state battery including: a battery element including, along a stacking direction, one or more battery constituent units including a positive electrode layer having a positive electrode extended portion, a negative electrode layer having a negative electrode extended portion, and a solid electrolyte layer interposed between the positive electrode layer and the negative electrode layer; a first external terminal joined to the positive electrode extended portion of the positive electrode layer; a second external terminal joined to the negative electrode extended portion of the negative electrode layer; and a protective layer that covers a surface of the battery element other than the positive electrode extended portion of the positive electrode layer and the negative electrode extended portion of the, the protective layer including a side portion which is located on a central region of a side portion of the battery element extending in substantially a same direction as the stacking direction, a first portion of the side portion of the protective layer having a first thickness dimension that is larger than a second thickness dimension of a second portion of the side portion of the protective layer other than the first portion.

Second Aspect:

The solid state battery according to the first aspect, in which in a sectional view, the first thickness dimension is a maximum thickness dimension of the side portion of the protective layer.

Third Aspect:

The solid state battery according to the first aspect or second aspect, wherein the side portion of the protective layer is curved outward in a sectional view.

Fourth Aspect:

The solid state battery according to any one of the first aspect to third aspect, in which a third thickness dimension of at least one of mutually opposing upper side portion and lower side portion of the protective layer on a main surface of the battery element extending in a direction substantially perpendicular to the stacking direction is larger than the first thickness dimension of the side portion of the protective layer.

Fifth Aspect:

The solid state battery according to the fourth aspect, in which a corner portion of the protective layer is curved in a sectional view.

Sixth Aspect:

The solid state battery according to any one of the first aspect to fifth aspect, in which the protective layer includes a resin-free insulating material.

Seventh Aspect:

The solid state battery according to the sixth aspect, in which the resin-free insulating material contains glass and ceramics.

Eighth Aspect:

The solid state battery according to any one of the first aspect to seventh aspect, in which the protective layer is a water vapor transmission preventing layer.

The solid state battery according to an embodiment of the present invention can be used in various fields in which electricity storage is assumed. Although the followings are merely examples, the solid state battery according to an embodiment of the present invention can be used in electricity, information and communication fields where mobile devices and the like are used (e.g., mobile device fields, such as mobile phones, smart phones, smart watches, laptop computers and digital cameras, activity meters, arm computers, and electronic papers), domestic and small industrial applications (e.g., the fields such as electric tools, golf carts, domestic robots, caregiving robots, and industrial robots), large industrial applications (e.g., the fields such as forklifts, elevators, and harbor cranes), transportation system fields (e.g., the fields such as hybrid vehicles, electric vehicles, buses, trains, electric assisted bicycles, and two-wheeled electric vehicles), electric power system applications (e.g., the fields such as various power generation systems, load conditioners, smart grids, and home-installation type power storage systems), medical applications (medical equipment fields such as earphone hearing aids), pharmaceutical applications (the fields such as dose management systems), IoT fields, and space and deep sea applications (e.g., the fields such as spacecraft and research submarines).

DESCRIPTION OF REFERENCE SYMBOLS

500: Solid state battery
300, 300α: Protective layer
301, 301α: Upper portion/lower portion of protective layer
302, 302α: Side portion of protective layer 302a: Predetermined portion of side portion of protective layer, side portion being located on central region of side portion of battery element
302b: Other portion other than predetermined portion of side portion of protective layer
300', 301', 302': Protective layer sheet
303α: Corner portion of protective layer
200: External terminal
200A: External terminal on positive electrode side
200B: External terminal on negative electrode side
100: Battery element
101: Side portion of battery element
102α: Main surface of battery element extending in direction substantially perpendicular to stacking direction
30, 30A: Buffer portion
30': Buffer portion paste
31: Portion formed from resin-free insulating material
31': Buffer portion paste containing resin-free insulating material
32: Portion formed from solid electrolyte
20, 20α: Solid electrolyte layer
20': Solid electrolyte sheet
10: Electrode layer
10': Electrode layer paste
10A, 10Aα: Positive electrode layer
10A': Positive electrode layer paste
10B, 10Bα: Negative electrode layer
10B': Negative electrode layer paste
D1: Thickness dimension of predetermined portion of protective layer, located on central region of side portion of battery element
D2: Thickness dimension of other portion other than predetermined portion of protective layer, located on central region of side portion of battery element
D3: Thickness dimension of at least one of mutually opposing upper portion and lower side portion of protective layer

The invention claimed is:

1. A solid state battery comprising:
a battery element including, along a stacking direction, one or more battery constituent units including a positive electrode layer having a positive electrode extended portion, a negative electrode layer having a negative electrode extended portion, and a solid electrolyte layer interposed between the positive electrode layer and the negative electrode layer;
a first external terminal joined to the positive electrode extended portion of the positive electrode layer;
a second external terminal joined to the negative electrode extended portion of the negative electrode layer; and
a protective layer that covers a surface of the battery element other than the positive electrode extended portion of the positive electrode layer and the negative electrode extended portion of the, the protective layer including a side portion which is located on a central region of a side portion of the battery element extending in substantially a same direction as the stacking direction, a first portion of the side portion of the protective layer having a first thickness dimension that is larger than a second thickness dimension of a second portion of the side portion of the protective layer other than the first portion, and
a third thickness dimension of at least one of mutually opposing upper side portion and lower side portion of the protective layer on a main surface of the battery element extending in a direction substantially perpendicular to the stacking direction is larger than the first thickness dimension of the side portion of the protective layer.

2. The solid state battery according to claim 1, wherein in a sectional view, the first thickness dimension is a maximum thickness dimension of the side portion of the protective layer.

3. The solid state battery according to claim 1, wherein the first thickness dimension is 20 µm to 200 µm.

4. The solid state battery according to claim 3, wherein the second thickness dimension is 5 µm to 50 µm.

5. The solid state battery according to claim 1, wherein the side portion of the protective layer is curved outward in a sectional view.

6. The solid state battery according to claim 1, wherein a corner portion of the protective layer is curved in a sectional view.

7. The solid state battery according to claim 1, wherein the third thickness dimension is 200 µm to 1000 µm.

8. The solid state battery according to claim 7, wherein the first thickness dimension is 20 µm to 200 µm.

9. The solid state battery according to claim 1, wherein the protective layer includes a resin-free insulating material.

10. The solid state battery according to claim 9, wherein the resin-free insulating material contains glass and ceramics.

11. The solid state battery according to claim 1, wherein the protective layer is a water vapor transmission preventing layer.

12. The solid state battery according to claim 1, wherein the protective layer is a sintered body containing insulating substance particles.

13. The solid state battery according to claim 12, wherein the sintered body has a porosity of 0.1 vol % to 20 vol %.

* * * * *